US007228453B2

(12) United States Patent
O'Brien et al.

(10) Patent No.: US 7,228,453 B2
(45) Date of Patent: Jun. 5, 2007

(54) TECHNIQUES FOR MAINTAINING HIGH AVAILABILITY OF NETWORKED SYSTEMS

(75) Inventors: Michael D. O'Brien, King County, WA (US); Bryan S. Klisch, King County, WA (US); John C. Vogel, King County, WA (US); Gregory I. Thiel, King County, WA (US)

(73) Assignee: GoAhead Software, Inc., Bellevue, WA (US)

( * ) Notice: Subject to any disclaimer, the term of this patent is extended or adjusted under 35 U.S.C. 154(b) by 910 days.

(21) Appl. No.: 10/399,286

(22) PCT Filed: Oct. 15, 2001

(86) PCT No.: PCT/US01/32238

§ 371 (c)(1),
(2), (4) Date: Aug. 1, 2003

(87) PCT Pub. No.: WO02/35312

PCT Pub. Date: May 2, 2002

(65) Prior Publication Data

US 2005/0071470 A1    Mar. 31, 2005

Related U.S. Application Data

(60) Provisional application No. 60/241,031, filed on Oct. 16, 2000.

(51) Int. Cl.
*G06F 11/00* (2006.01)
(52) U.S. Cl. .................................. 714/13; 709/220
(58) Field of Classification Search ................ 714/13, 714/4, 15, 20; 709/220, 221
See application file for complete search history.

(56) References Cited

U.S. PATENT DOCUMENTS

| 6,105,094 A * | 8/2000 | Lindeman ................... 710/107 |
| 6,243,744 B1 * | 6/2001 | Snaman et al. ............. 709/220 |
| 6,438,705 B1 * | 8/2002 | Chao et al. .................... 714/4 |
| 6,487,622 B1 * | 11/2002 | Coskrey et al. ............. 710/241 |
| 6,748,381 B1 * | 6/2004 | Chao et al. ................... 707/10 |

* cited by examiner

*Primary Examiner*—Nadeem Iqbal
(74) *Attorney, Agent, or Firm*—James L. Davison

(57) ABSTRACT

This computer implemented software invention supervises networked system resources with the goal of maximizing service availability, providing on-demand and uninterrupted access to service, and minimizing the down time due to failures. It is a cluster-wide solution that co-ordinates the states and activities of resources, assigns availability roles, implements recovery from failures, and implements overall system policy. To do this, it maintains a system model of the system's physical and logical configuration and models the resources using managed objects that provides an extensive representation of the states, roles, and relationships of the systems resources.

7 Claims, 8 Drawing Sheets

TECHNIQUES FOR MAINTAINING HIGH AVAILABILITY OF NETWORKED SYSTEMS

This application is entitled to the benefit of Provisional Patent Application Ser. No. 60/241,031 filed 2000 Oct. 16.

This invention of this application is related and complimentary to the invention of our co-pending PCT applications, Ser. No. PCT/US01/25835, Filed 17 Aug. 2001, titled A System and Method for Managing Clusters Containing Multiple Nodes and Ser. No. PCT/US01/10726, filed 02 Apr. 2001, titled Constructing a Component Management Database for Managing Roles Using a Directed Graph, which are incorporated herein by reference in their entirety.

BACKGROUND OF THE INVENTION

1. Field of Invention

The invention relates generally to the field of networked computer systems. More particularly, methods for maintaining the operation of these systems in the event of component failures, application errors, middleware errors, or operating system errors.

2. Description of Relevant Art

To maintain the operation of computer networks in many areas of computer use is becoming increasingly important. Communications, banking, Internet servers, and other 24-hour services rely on continuous, dependable computing in order to be successful. One of the early highly available systems was a fault tolerant system that used multiple processors, run in lockstep, that continually compared outputs and if there was a discrepancy between the two then that occurrence was designated a "fault" and the processing was switched over to another processor cell. There are also other schemes that vendors use in purely hardware fault tolerant systems. However, since many failures are caused by software related issues it's important to have a process that can handle these types of failures and that can seamlessly and quickly switch over the duties of the failed software to other running software. Current art provides a number of proprietary systems that are designed to run on particular operating systems and that support specific types of network resources. The present invention contains the flexibility to be incorporated across a variety of operating systems and it can be configured to support multiple types of resources and resource applications.

SUMMARY OF THE INVENTION

In summary, the invention comprises a method for maintaining on demand and uninterrupted availability of a networked system of computer nodes. A networked system of computer nodes incorporates a number of hardware and software resources. To maintain the operation of those resources or to transfer the responsibility of those resources that are no longer able to carry out their functions, it is first necessary to determine what resources are present on the networked system. Once the resource is identified then an abstraction may be generated that represents the capabilities, methods and dependencies of that resource. To manage the resources once their presence, capabilities and dependencies are determined, a specific node is selected as the managing node. Another node is selected as a standby for the managing node. A communication link is established between the manager, the standby manager, the non-manager nodes and the other resources. The manager and standby manager incorporate the policies necessary to maintain the high availability of the system depending on the changing system status and conditions. In response to the changing system states and conditions the manager reassigns the resource roles as required.

BRIEF DESCRIPTION OF THE DRAWINGS

The invention, together with further advantages thereof, may be best understood by reference to the following description taken in conjunction with the accompanying drawings in which.

DETAILED DESCRIPTION OF THE BEST MODE

Figure 1:
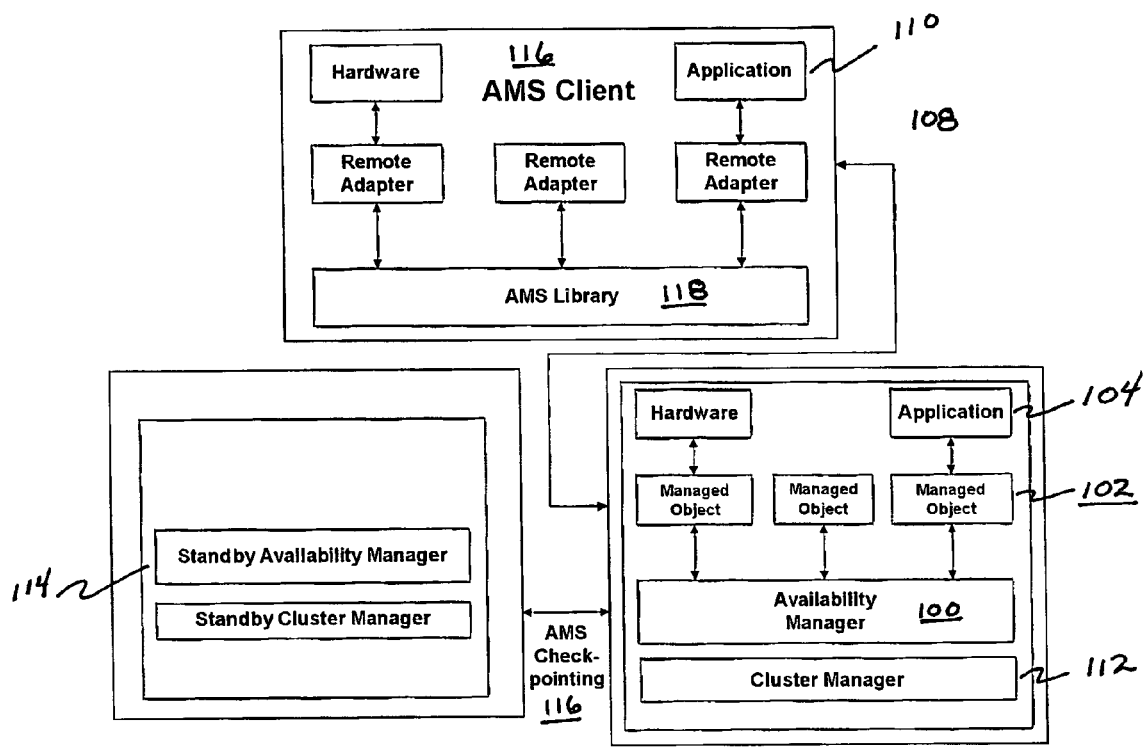
FIG. 1 shows the general topology of the availability manager.

Glossary:

Attributes

The set of data values that define the current state of a managed object. The permissible attributes for a managed object are defined by the managed object class.

Availability Management Service (AMS)

A suite of availability facilities provided by the availability manager and its associated application interface libraries for resources in the cluster. It includes the availability manager, its standby, the system model, and its access APIs.

Availability Manager

The manager running inside the availability process on the cluster manager node provides availability services to resources over the cluster. As an example of the type of resources that can be supported, attention should be directed to FIG. 2. These resources can include the network 200 itself, the card chassis 202 which can contain communication switching cards, the cards themselves 204, applications 206, and the operating system 214. There is a single instance of the availability manager and a single availability manager standby per cluster.

Availability Manager System Model

A logical representation of all the resources of the cluster that are under management by the availability management service. It is an extensive representation of the state and relationship for these resources in the form of a hierarchical, dependency-based network of managed objects. These managed objects represent the actual resources and have attribute values that represent the actual state of the corresponding resource.

Discovery

A process where a resource is discovered and identified by a registrar that registers the resource with the availability manager to create a managed object.

Interface Repository

Figure 2:
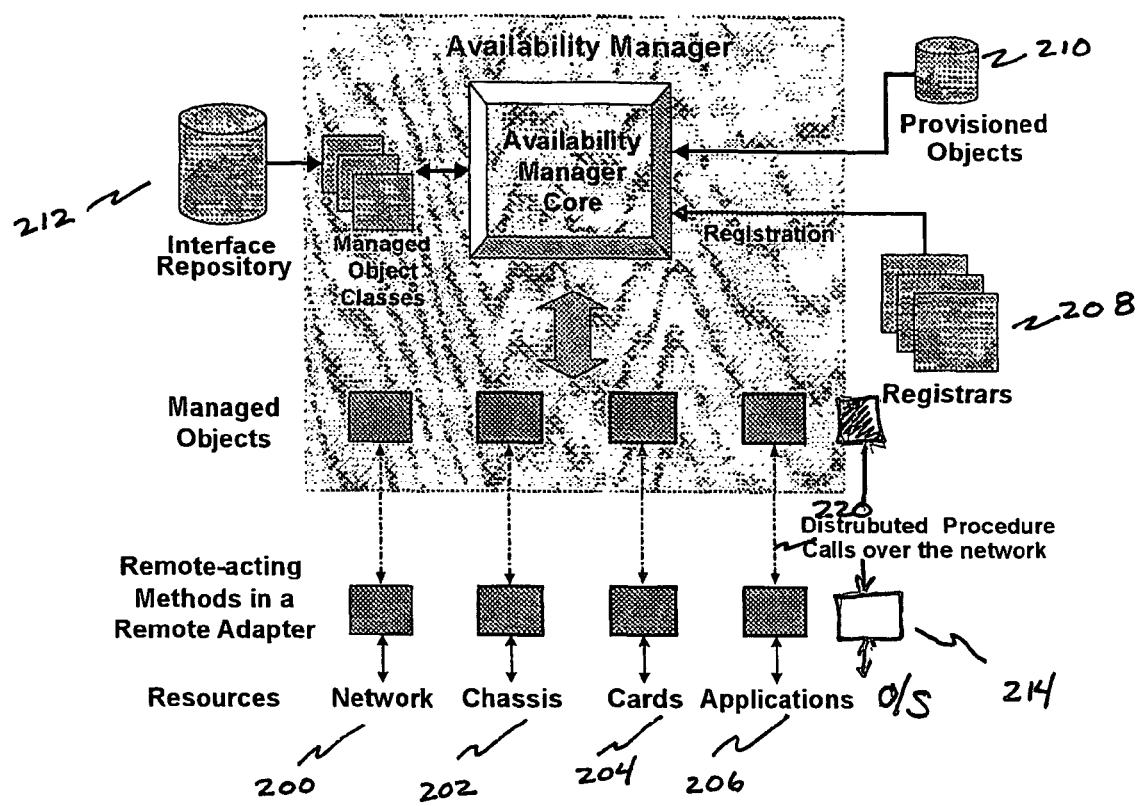
FIG. 2 shows the availability manager architecture.

The interface repository 212, as shown in FIG. 2 is the definition of the available managed object classes that are configured in the system.

Managed Object

An instance of a logical representation for a given resource in the system. It is created by the availability manager using the managed object class as a template and stored in the availability manager system model. This definition is often abbreviated to object.

Managed Object Class

The template from which managed object instances are created. Managed object classes 710 define the interface between the availability manager and the resource. They provide attributes to describe the operational state of the resource and methods to manipulate and control the resource. Managed object classes may be subclassed where they inherit the attributes and methods defined by other classes the availability manager supports both inheritance and polymorphism. Managed object classes may also provide state machines, Web pages, and extensive fault management.

Managed Object Provisioning

This may occur at system initialization, or subsequently at run time in response to user commands. Provisioned managed objects 210 FIG. 2 may or may not have an associated resource present. The availability manager system model may also be provisioned with managed object classes, service groups, and tasks.

Managed Object States

The availability manager stores state values as managed object attribute values. These include the operational state (opState), which defines whether a managed object can take an operational part in the system; the administration state (adminState), which defines whether a managed object is locked or unlocked for administration purposes; and the resource state (resourceState), which defines the basic resource health.

Methods

The set of procedures that may be called on an object.

Object Resource Locator (ORL)

An object reference string (name) uniquely identifying a managed object.

Registrar

The extension or application code that: 1) discovers resources, 2) creates managed objects, and 3) deletes them. Registrars are normally provided by developer-created Present invention extensions or applications and are separate to the managed object class for which they are creating managed objects.

Remote-acting Method

A remote method where the associated object is in one process, and the method implementation is in another.

Resource

The actual managed component. For example a server, card, fan, switch, or an application.

Extension

The delivery mechanism for adding managed object classes to the process.

Service Group

Defines the redundancy model and policy to be used by a set of similar managed objects and corresponds to the ISO term "protected group". Often abbreviated to "group". It defines the switchover policy and its parameters to effectively govern role assignment, managed object failures, and switchover events.

The present invention incorporates the term Availability Management Service (AMS) to describe its operation and embodiments. The purpose of the AMS is to manage clusters of processor nodes with the goal of maximizing service availability. From the user's perspective, service availability means:

On-demand service—99.999% system uptime, meaning the system is up for all but five minutes or less per year. A system with five nines or better uptime is usually referred to as highly available.

Uninterrupted service—Customer connections maintained without interruption, regardless of individual resource failures.

"System" is used here to encompass hardware and software that are logically grouped together because they provide a service to some consumer, whether that be a person or another machine. A system may provide multiple services, and systems are often combined together to provide increased functionality.

AMS enables systems to achieve five-nines or better uptime. Downtime is minimized by reducing both the frequency of service affecting failures (Mean-Time-Between-Failure or MTBF) and the amount of time it takes to become operational after such a failure (Mean-Time-To-Repair, or MTTR). In addition, AMS manages the resources of the system to preserve transaction states during fault management scenarios.

Resources

System resources are the hardware, software, and data that comprise the system. A resource is any part of a system that is individually managed. In infrastructure equipment, resources include:

Hardware—Disk drives, boards, fans, switches, cables, chassis, lights, and power supplies.

Software—Operating systems, drivers, servers, content, and applications.

Logical entities—Databases, network topologies, routes, geographical regions, clusters, and services.

In many systems, redundant resources are used to help reduce downtime. For example, redundant networks are prevalent at telecommunications and data communications sites. Redundancy may also be at the software level. For example, standby applications are ready to take over should the active application crash.

Functional Overview

To achieve the goal of maximizing service availability, AMS performs several functions:

Maintains a system database to track all the resources in the system. The database incorporates the configuration, state, relationships, and dependencies of the resources.

Coordinates the states and activities of the system resources to assign availability roles (such as active and standby), manage switchover required due to failures or planned downtime, and implement overall system policy.

Provides a set of access and manipulation APIs to control the system database.

Controls service groups, which are collections of resources that cooperate via standby relationships, such as N+1 or Active/Active.

Manages itself. For example, the availability manager has a standby that assumes responsibility should the availability manager fail.

The AMS integrates tightly with a fault management service to provide a powerful fault and availability management solution. The fault management service detects failure of a managed object and notifies AMS. Then, AMS manages recovery, which can include switchover to a standby managed object.

Standards

The availability manager supports a subset of ISO X.731 state management function standard. This standard describes the administration and operational states, as well as the control and availability status attributes. Other supported standards include XML 1.0, HTTP 1.1, and SNMP v3.

The availability management service invention is a cross-platform, heterogeneous, scalable, and efficient centralized manager of overall system availability. Design goals of the service include the support of:

99.999% availability—Used with fault management and the appropriate redundant resources, the availability manager detects, diagnoses, isolates, recovers, and "repairs" failures with minimal downtime.

Robustness—To provide a platform for 99.999% availability, the availability manager itself must be even more reliable, with a design target of six nines (99.9999%), which is 50,000 hours MTBF.

Extensibility—The base classes provide certain functionality for use as is. They also allow subclassing to extend the behavior in extensions that run in process with the OMS, or in separate applications.

Extensible policies—The availability manager is governed by policies that the developer may supplement and/or over ride to customize AMS' behavior.

Integration and modularity—The availability management service integrates with a Cluster Management Service, SNMP, and other technologies to create a single coordinated management framework. The AMS is modular so that server or client capability may be separately included. Also, in systems where availability management is not required, it may be excluded.

Compact size and cross-platform—To minimize memory footprint in embedded systems, the AMS re-uses as much as possible existing technology including other extensions. The smaller the footprint, the larger the population of devices that may embed the AMS. To address this diverse population, the AMS is designed as operating system and processor architecture neutral.

Control and management—The availability manager provides management interfaces to permit operations to be initiated and controlled via APIs, SNMP, and Web-based interfaces. It has diagnostic capabilities, both real-time and historical, to determine the root cause of failures and their relevant impact on the availability of the system.

Long-lived systems—The availability manager provides the capability and primitives to implement resource, node, and cluster-wide upgrade strategies.

Wide variety of devices—AMS is designed for a minimal memory footprint and to be operating system and processor architecture neutral. Additionally, it can manage many different types of resources.

Wide applicability—Cross-platform and cross-language capability allows AMS to be used with many different operating systems, hardware platforms, processor architectures, and programming languages.

High performance—AMS supports the overall platform availability goals of:

Systems implemented with the availability manager must be capable of a host system processor switchover in less than five seconds. The availability manager achieves this goal by being a highly efficient, tightly coupled, multi-threaded implementation that can execute simultaneous non-conflicting operations in parallel.

Architecture

Overview

AMS is a distributed, client-server suite of extensions that run separate processes on different nodes on the network. All of the participating processes are assumed to be running on a private network. In addition, the AMS may also run on single, stand-alone systems that are not networked. In this case, there may or may not be redundant hardware (for example, processors or disks) and redundant software (active and standby applications). In either case, the SRP communicates with applications running locally or remotely via AMS libraries linked into those applications.

Managed Objects and Registrars

The AMS manages resources in the presence of failure or planned downtime. To accomplish this task, the AMS architecture supports two key abstractions: managed object and registrars.

A managed object is a software entity that provides a common management interface for each resource. Managed objects represent a wide variety of different resources that are given a single set of attributes and methods, which are then used to interact with that resource.

Managed objects are instantiated from managed object classes. The assumption of a managed object class is that many different resources can be described in a common way through a set of attributes and methods. Methods are programmatic functionality that all objects of a class must provide. Managed object classes may be sub classed to better model the behavior of the associated resources.

Although separate from the AMS, registrars manage the life cycle of resources. Registrars 208 as shown in FIG. 2, detect resources, create managed objects to represent them, and delete those managed objects. This architecture is similar to a transaction processing system that contains resource managers, applications, and a transaction manager (the AMS).

AMS might be considered the availability engine or processor—a standard component that has the same behavior on any system. The registrars will vary from system to system because they are resource-specific.

Availability

The system must survive any single failure (excluding catastrophes), including failure in the availability manager itself. This requirement results in an active availability manager—standby availability manager structure similar in some ways to a process with watchdog.

In order to minimize downtime, faults must be detected as quickly as possible. Ideally, latent faults are detected and eliminated before they result in an actual resource failure. This proactive elimination of latent faults increases availability by allowing failures to be serviced before a compound failure (active and standby failures) becomes an outage.

The AMS architecture enables the construction of highly available systems by supporting the use of fault management for latent fault detection Hardware and software failover is managed through industry-standard topologies, such as one standby for multiple active resources (N+1). Additionally, human and device interfaces are used to manage planned downtime of individual resources for upgrades and other maintenance activities such that no service availability is lost.

AMS assumes the existence a reliable messaging system "under the hood". For example, sending a message is not re-tried if it fails.

Extensibility

The AMS provides much of the required functionality to build a complete high availability system. It supplies the generic capability while providing developers with the capability to design their own unique system-specific behavior. For example, developers must create their own system model, but they use AMS APIs to instantiate it.

Similarly, the AMS provides failover policies (N+1, etc.), but in some cases these are not enough. The developers must supplement or replace these policies in some cases, such as when there are unique hardware constraints.

In general, the SRP architecture provides many opportunities to extend or modify the behavior of the management solution via adding content, whether it be management web pages or fault detectors. The standard availability policy module can be replaced to provide specialized policies for specific service availability situations.

Manageability

The AMS architecture works with existing management paradigms such as the Simplified Network Management Protocol (SNMP). This integration allows existing management consoles and SNMP managers to control a system incorporating the AMS. Also, technicians must often access such a system on-site and need a mechanism for local, user control.

In order to accommodate these requirements, the AMS re-uses existing technologies that plug into the cluster systems side-by-side with the AMS.

Upgrading

To support upgrading, the AMS capabilities can be used to manage a system during a rolling upgrade to maintain service. Upgrade capability also extends to many of the technologies on which the AMS builds. For example, databases schemas must be upgradeable at run time, and older clustering software interoperates with newer software so that an old node may come online and be upgraded.

Scale, Footprint and Performance

All of the design goals must be achieved without excessive memory footprint or CPU consumption. Typical embedded systems budget no more than 3%-5% of the available memory and 2%-3% of the CPU cycles to the management function. The AMS manages systems with thousands of resources and has sub-second error detection and recovery initiation.

Managers and Clients

Several components distributed across the cluster comprise the availability management service (see FIG. 1). The components are:

Availability Manager

Standby Availability Manager

AMS Clients

As illustrated in FIG. 1 the availability manager 100 is a multi-threaded availability engine that supports concurrent operations and provides a resolution mechanism to ensure that simultaneous operations avoid conflict. The availability manager employs a fine-grained thread locking mechanism to provide a high degree of parallelism for operations. To ensure efficient thread creation, the availability manager uses threads from a thread pool as required.

The availability manager also provides a transaction facility so that operations may be tagged and operations performed atomically across a set of managed objects. The transactions can be queued and prioritized. A transaction priority determines where in the pending transaction queue a given transaction is placed while it attempts to get its necessary reservations.

The availability manager runs on the same cluster node as the cluster manager and it integrates tightly with the cluster manager to provide cluster-wide availability service. The availability manager provides availability services for the resources across all nodes in the cluster.

As previously mentioned, the management of the resources is accomplished via managed objects that represent the resources. AMS maintains the managed object database by instantiating objects of the managed object class at the request of a registrar, storing them in memory, and persisting them to disk.

The standby availability manager 114 provides a hot standby for the availability manager in the event the manager fails. The standby availability manager receives all managed object state changes from the availability manager so that it can assume availability services with minimal delay or loss of state.

The active and standby availability managers depend on the cluster management service 112 to heartbeat each other to keep tabs on the other's status.

The active and standby availability manager roles may be statically configured (using a configuration file), or determined at run time. If the standby fails, the active manager finds a new standby. If the active fails and the standby takes over (becomes active), the system will attempt to find a new standby manager. Client nodes may be designated as candidates for manager roles, or they may have client-only capability as determined by their configuration files or dynamic policy modules.

AMS clients 116 as shown in FIG. 1 communicate with the availability manager via the availability manager library 118 linked into the application. The library uses the Distributed Procedure Calls (DPC) 220, as shown in FIG. 2, to send requests to the availability manager on the cluster manager node for execution and to receive method invocations from the availability manager. Client applications may be on the same node or a different node than the availability manager.

Cluster Manager Integration

AMS integrates with the duster management service at system initialization time and during operation. On initialization, the cluster management service selects the node that will function as the cluster manager and as the availability manager. As part of node incorporation the cluster manager creates managed objects to represent it and all cluster nodes. A service availability group is created to select the cluster standby manager. Managed objects are also created to represent the management networks.

Resources

A system has many diverse resources that may be hardware, software, or logical components. Examples include a fan, CPU, network, communications card, application, or database. These resources have states and need to be managed and controlled in a coordinated fashion. The availability management service provides a framework to manage a diverse set of resources in a consistent and uniform way, while providing for the unique aspects of each resource.

Resources may be distributed in any cluster node and may interact remotely with the centralized availability manager. Remember, the AMS does not work directly with resources; all interactions with resources is through the managed objects that represent them. Resources, like applications, may have an embedded "management component" or have a separate "management component". A process may act as a "management component" for a single resource or multiple resources. The "management component" may be local to the resource, local to the availability manager, or remote from both the availability manager and the resource. Managed resources can be inside or outside the cluster.

Design Description

A system model is an abstract description of resource capabilities, interfaces, relevant data structures, and interactions. This abstraction is made useable by:

Mapping the different parts of the system model to AMS elements such as managed objects, registrars, and dependencies.

Writing code that creates and manages these elements.

This design discussion describes the AMS elements in order to facilitate the creation of the system model and its realization in software. See FIG. 2.

AMS Elements

The availability management service contains the following elements:

Availability manager and standby availability manager
Roles
Managed objects
Managed object classes
Service groups
Transactions
Remote-acting methods
Heartbeats
Registrars
Provisioned objects
Dependency relationships In FIG. 2, the elements reside on the cluster manager node except for the resources and the remote-acting methods, which are dispersed throughout the cluster. Managed object classes and managed objects always reside on the same node as the cluster and availability managers. Communications with remote-acting methods occurs via DPC over the network.

Availability Manager

The availability manager creates and maintains the AMS system model. The availability manager calls into the interface repository 212 that contains the managed object classes to create managed object instances that represent the resources. It is an error to attempt to create an object without its corresponding class.

The availability manager keeps these managed objects in the database that defines the current state of the entire system. All invocations on managed objects are handled by the availability manager, which uses transactions to coordinate concurrent access to the system model. Invocation may be local or remote. Because invocations go "over the wire" in the latter case, failure detection services provided by the cluster management service and the distributed message service are used.

The availability manager provides API-level access to its services for both local access inside the Present invention Process on the cluster manager and for remote access over the cluster.

The availability management service is implemented as three extensions that are loaded into or are linked into applications. The extension architecture allows additional functionality or content to be loaded at run time into the SRP.

The three availability management service extensions are:
amsClient—Contains the client interface APIs to the availability manager.
standby—Contains the logic for the standby availability manager.
amsMgr—Contains the logic for the availability manager.

AMS is implemented in this modular fashion so that the SRPs load only the extensions they require. For example, a non-cluster manager node only loads the amsClient extension.

AMS applications should link against the library and load the availability manager extension. This provides the interface logic to communicate with the availability manager. The library provides an AMS client application or the resource's remote-acting methods with run-time support, so the availability manager can invoke remote-acting methods and the managed object methods or client application can call the available availability manager API.

Standby Availability Manager

The existing standby availability manager design can be broken into four phases:
Selection of the standby availability manager
Getting the standby availability manager current ("up to speed") with the active availability manager
Receiving and processing the availability manager's checkpoint data by the standby availability manager
Failover or switchover processing of the standby availability manager based on a detected failure of the active availability manager (failover) or direction from the active availability manager (switchover).

Each of these phases occurs at different points in the lifetime of the node or the availability management service on the node. The phases are described below.

Standby Availability Manager Selection

The standby availability manager is always co-located with the standby cluster manager. Thus, selection of the standby availability manager is actually determined by the selection process for the standby cluster manager. The standby cluster manager selection is determined based on two sets of data. The first set is the preferred role setting in cluster nodes' app.xml files. The preferred role must be standby manager or manager and not a bridged IP node in order for the node to be considered as a possible standby manager. The non-bridged IP nodes with these preferred roles have their CMS managed objects placed in the cluster manager service availability group to select the (single) standby cluster manager. AMS communicates the policy selection to the managed object via invocation of the standby method on the CMS managed object of the selected node. The standby method results in CMS, on the correct node, being told to become the standby cluster manager. The CMS code performs the actions it requires to become a standby cluster manager and then initiates the standby availability manager processing on the same node.

The key issues of the whole process are that: the policy is open, the entire process occurs after the cluster has formed (including activation of the availability manager) and the availability manager is always co-located with the cluster manager.

Standby Availability Manager "Getting Up To Speed"

After being selected, the first step that the standby availability manager must perform is to become current with the active availability manager (normally called the "availability manager"). The purpose of the action is to get the standby availability manager to have a "current copy" of the system model being maintained by the active availability manager. This involves communicating the following between the availability manager and the standby availability manager:

All objects in the system model and their replicated attributes

All transaction starts and stops that have been successfully performed

All scheduled post API functions for a given transaction

All remote adapters that have been registered

The standby availability manager uses this data to build its copy of the system model locally. The objects are created in AMS and their attribute values populated. The local class repository is accessed to provide the class implementations required for the managed objects. The data structures that are built are the exact same data structures used for the system model on the availability manager. A similar process occurs for the transactions. Transactions that have successfully completed their registration step are created on the standby availability manager. No actual reservations are performed. The scheduled post API functions for a given transaction are checkpointed and also created on the standby availability manager. Lastly, standby maintains information about the remote adapters that have been registered. The remote adapters are only partially created.

As the standby manager receives the "get up to speed" data from the availability manager, the active manager marks the managed object as requiring ongoing checkpoint data generation. This process means that "get up to speed" processing does not need to lock out all processing on the availability manager's system model. Instead, object by object processing can occur with normal concurrency control locks being used to protect each object as it is touched. This minimizes disruption on the availability manager and still allows the standby availability manager's system model to be consistent with the availability manager's system model. The "get up to speed" process does not process the system model managed objects in a particular order based on their relationships. Instead the objects are effectively processed in a random order (handle order). If an object is visited that references a non-existing managed object as a dependent, follower, leader, shutdown leader, or ORL ancestor, then the referenced object is created as a "zombie" object. The "zombie" objects become real objects as they are actually visited in the "get up to speed" process.

The "get up to speed" and ongoing checkpoint process enforce that all created managed objects and transactions are created with the same object handles as the same objects on the availability manager. This is required because these handles are application visible via the AMS API. If the active manager fails before the standby manager is "up to speed," then the standby manager loads its system model from its provisioned store and tells all registrars to initialize. All AMS client applications must discard known handles after receiving an initialize.

Receiving and Processing Checkpoint Data

After a managed object or transaction has been "brought up to speed" on the standby availability manager the availability manager maintains an ongoing checkpoint stream to make sure the managed object or transaction remains consistent with the version on the availability manager. The checkpoint stream includes information on every object change on the availability manager. In addition, it contains information about the APIs and methods performed against the system model. This information is use to complete those operations should a failure occur while one of the actions was in progress. The checkpoint data is sent from the active to standby availability manager using the guideline that the standby availability manager should be aware of all information that was returned to an application. This means that the checkpoint data is flushed to the standby availability manager prior to returning any application initiated API. The flushing does not guarantee the standby availability manager is completely current with the availability manager, but it does attempt to make that window of inconsistency as small as possible.

The processing of the checkpoint data occurs in a strategy similar to the earlier processing. The operations are performed locally by the standby availability manager on its own data structures. The expectation is that the standby availability manager is maintaining enough information to become availability manager without extensive delays.

Failover and Switchover Processing

Failover processing is initiated when the standby cluster manager detects the (active) cluster manager as failed (via heartbeat failures). The standby cluster manager "re-forms" the cluster based on the nodes that are still actively responding to heartbeats. To support this, the standby cluster manager has active heartbeats to all nodes and open DMS route connections established. Thus its failover processing is minimal since most of the context is established. The standby cluster manager activates the standby availability manager.

The standby availability manager is expected to be "up to speed" and receiving checkpoint data as actions occur on the availability manager. For the availability manager to complete the activation it must do the following:

Notify clients a failover is in progress

Make sure any pending checkpoint data is applied

Persist the check pointed system model to guarantee the persisted system model and the local system are consistent Establish the reservations for all transactions that had existing reservations Re-establish DPC plumbing to all AMS client applications Re-establish DPC plumbing to all remote adapters Notify clients the failover has completed—this includes publishing the message that will inform all clients that the new standby availability manager is active Clean-up any data structures used for check pointing AMS client applications and extensions must also take certain actions to properly react to the failover. The actions are not customer code visible because they are handled in the application API stubs. The effect of the code in the application API stubs is to:

Convert any timed out API request from a network failure into a retry. The stub code detects the presence of the standby and retries the request to the new availability manager when the standby manager has a stable local system model. This is identified by a notification from the activating standby availability manager.

Process an activated standby availability manager notification into the retransmission of the request.

The effect of the code in the extension API stubs is to lock any API requests that occur prior to the standby availability manager completing its activation and local system model stabilization. Based on notification of the local system model stabilization, the blocked APIs are allowed to proceed.

Roles

The availability manager performs operation role assignment for managed objects in service groups, and it drives managed objects to respond to changing system state and conditions, reassigning roles as required. A managed object failure causes the availability manager to quickly bring a standby resource into action without downtime or interruption of service.

As assigned by the availability manager, managed objects assume one of the following roles:
Active
Standby
Unassigned Invoking the appropriate API modifies the managed object representing that resource, and therefore changes the role of the resource. The managed object is responsible for communicating and controlling the resource to ensure the desired behavior. The changing of roles is referred to as role assignment and is discussed further below.

Roles can also get assigned based on an object being a follower of a managed object. In this case, the follower's role tracks its leader's role changes—unless it disables. An object that is neither a follower nor a member of a service group is given an active role when it enables. When it disables, the role is changed to unassigned.

Managed Objects

The managed object is the management software representation of the resource within the AMS. From a management perspective, the managed object is the resource.

A managed object instance of the required class is created for each resource under management. The state and configuration of the resource may be examined and controlled by the reading and writing of managed object attributes, and the resource may be manipulated by invoking the resource methods.

Managed objects are a sub-class of the object class 700 provided by AMS's object engine. Managed objects provide the following semantics:
Implement the state behavior represented by AMS's support for ISO X.731.
Implement role semantics to allow objects to be represented as active, standby or unassigned.
Implement dependency relationships between managed objects.
Implement a service group membership relationship between the object and a named service group.
Implement follow the leader semantics to allow the managed object to track the role assignments of another managed object.
Implement a heartbeat mechanism to monitor health of the managed object.
Implement the honoring of transaction reservations for all state engine related operations.

A human-readable Object Resource Locator (ORL) uniquely identifies managed objects. For example:
/myClusterName/server3/carrierCard0/Pmc0/app0

This ORL names a managed object that represents an application running on a PMC that is part of a carrier card in server 3. Like a URL, the ORL follows a similar slash-delimited format, where each segment corresponds to a managed object. No spaces, "+", or "&" characters are permitted in ORLs.

An ORL can use aliases to conveniently reference common objects. The availability manager APIs automatically expands ORL aliases to their corresponding full definition. The defined aliases include:
~localhost Represents the ORL for the local node
~cluster Represents the ORL for the current cluster Managed Object Classes Managed object classes 710 are the templates from which managed objects are created. They provide the necessary support to effectively model resource state and behavior in the system. Managed object classes define a set of attributes to model the state of the resource and access methods to control the resource. Managed object classes may also provide other content that is not directly related to availability management. For example, they can include Web pages to incorporate into a management user interface, or fault detectors for fault management.

Managed object classes are defined by the developer in the interface repository by using the srAmsCreateClass API, which specifies the complete details of the class, including the locations of the attribute and method XML description files and the name of the Present invention extension containing the class. Alternatively, classes may be configured statically using the classes.xml file.

All managed object class extensions need to be loaded by every SRP on a cluster that contains, or may contain, the active or standby availability managers. Loading the extension containing the managed object class ensures the class is available for instantiation when a registrar needs it.

The managed object classes are packaged and delivered as system extensions. A system extension may provide one or many classes in a single extension. At execution time, the extensions are dynamically loaded as required to load the classes and create managed object instances. This permits a "plug-and-play" style of mechanism where classes are loaded only when the relevant resource requires their presence.

This discussion focuses on additional behavior such as attributes and methods that the managed object class adds to the parent class. Like its parent class, the managed object class does not have class methods or attributes. Therefore, this discussion applies to each object instantiated from the class itself.

A managed object class consists of the following elements:
Super class
Attributes
Methods
Optional management user interface
Optional extended fault management
Super classes Classes are an object-oriented abstraction of the resources of the system. They can inherit capability from other classes (their super class). The class hierarchy can be characterized by:
Single inheritance
Polymorphism where subclasses may override base methods to replace or augment class behavior For example, it is possible to generate subclasses from an existing class for an Ethernet card and creates a class for a specific type of Ethernet card by adding a new attribute and method to control its additional features.

The super classes for a class are specified when the class is created via the srAmsCreateClass API. The attributes and methods of a super class may be accessed using the srAmsGetAttribute API, srAmsSetAftributes API, and the "SR_SUPER" macro, respectively.

AMS super classes include:
managedObject 710
remoteObject 740
directory 730
serviceGroup 720
user defined object 750

The base class managedObject provides foundation attributes and methods that all managed object classes must inherit. The remoteObject 740, directory 730, and serviceGroup 720 classes have managedObject 710 as their super class.

Attributes

Attributes are the set of data values that define the current state of an object. A class defines a set of attributes with default values via an attribute XML definition file. Members of that class will possess these attributes and all the attributes of any specified super class. Attributes are of type srkValue_t that may contain string, integer, long integer (64 bits), char (8 bits), or blob (binary large object). Note: AMS provides no heterogeneity support for attributes who's value is a blob.

Attributes can be designated as one or more of the following: observed, persistent, read-only, replicated, or protected. Observed attributes have the get and set methods called to manipulate them. Persistent attributes will be saved to storage and will retain their values across system reboots. Read-only attributes may not have their value modified. Replicated attributes have their values automatically checkpointed to the standby availability manager. Protected attributes may only have their value modified by the system manager. Present invention 2.0 does not enforce the protected designation.

New attributes may be defined by subclasses. If a subclass defines an attribute of the same name as a previous attribute, the latter will shadow the original attribute. Shadowing means that the previous attribute is hidden from default view, but it is still accessible by explicitly naming the defining class name when accessing the attribute. This is useful for a class to guarantee that it can always access its attributes regardless of whether subclasses may define attributes of the same name. The system manager also provides APIs to get, set, and enumerate an object's attributes.

To read an attribute value, the srAmsGetAttfbute API is used. This call takes the name of the class (or NULL to let the system determine the class) defining the attribute to specify the relevant attribute. Similarly there are APIs for setting the value of attributes. Attributes can also be statically loaded at run-time (provisioned objects).

Attributes names starting with an underscore are reserved for use by Present invention.

Methods

Methods are functions that are invoked per object as required to provide the ability to access and control resources. Class methods are expressed as native C language procedures and are described in the method XML definition file for the class. (Note: There is no enforced consistency between these two. The XML definition file is used only to support the interface enumeration APIs.) Present invention also provides an Interface Description Language (IDL) compiler that generates the remote-acting methods stubs.

Methods may be defined as abstract where there is no base method implementation. Subclasses must supply the method implementation.

When a subclass defines a method of the same name as that defined in a super class, the new method overrides the super class method. Unlike attributes that shadow previous definitions, methods override previous method definitions to implement polymorphism. This means that if a base class calls a method, the overridden method version is invoked—not the original base method. This is very useful as it allows subclasses to augment or replace the functionality provided by base classes.

Methods can be invoked statically by calling the C interface via the SR_METHOD macro. APIs are defined to enumerate methods, and to retrieve method details for a given object instance. Methods may only define an integer return code. However, any method parameter may be used to return arbitrary typed data items.

There are three different ways methods act: locally, "remote acting," and a combination of both. Locally acting means that the methods are invoked and run in the same process. A remote-acting method is one where (regardless of where the method was invoked) the method itself runs in a different process from where the object is. The combination can occur when some processing occurs locally before or after the "remote-acting" method logic is invoked.

Logic to control the resource can reside centrally with the availability manager in the managed object class, or remotely in remote-acting methods (see the discussion below on remote-acting methods). The design decision as to where to locate the control logic should be influenced by whether it should be close to the availability manager or close to the resource.

Methods starting with underscore are reserved for present invention.

Methods used by the AMS state engine can impact engine responsiveness on failures due to network errors or other unusual delay response. The primary example of this is a remote-acting method that has lost its remote adapter. AMS deals with this by disabling the remote-acting methods of a managed object when a network error is detected. Subsequent calls to the remote-acting methods in the remote adapter do not go over the wire until the methods are re-enabled. The enabling and disabling of the remote-acting methods can be done explicitly via the srAmsEnableRemoteMethods and srAmsDisableRemoteMethods APIs.

Management User Interface

A managed object class may provide a Web-based user interface to plug into the console to administer, monitor, and control managed objects. The format of these 3The managed object class definition should be provided the URL of the home page for the management user interface.

Extended Fault Management

Present invention has a comprehensive fault management service, which allows the creation of fault detector hierarchies that can detect and diagnose complex faults and conditions. By integrating this facility with the availability manager, the managed object can be informed of faults that would otherwise go unnoticed.

Service Groups

The availability manager groups managed objects for redundant resources into logical services called service groups. A service group corresponds to the ISO term "protected group". The availability manager manages the redundancy policy and assigns operational roles to each managed object according to the managed object's operational state and redundancy group policy.

After a service group is created and its managed objects exist they can be associated by setting the serviceGroup attribute of the managed object Similar to other managed objects, service groups may be created by provisioning, or by registrars at run time.

Figure 5:
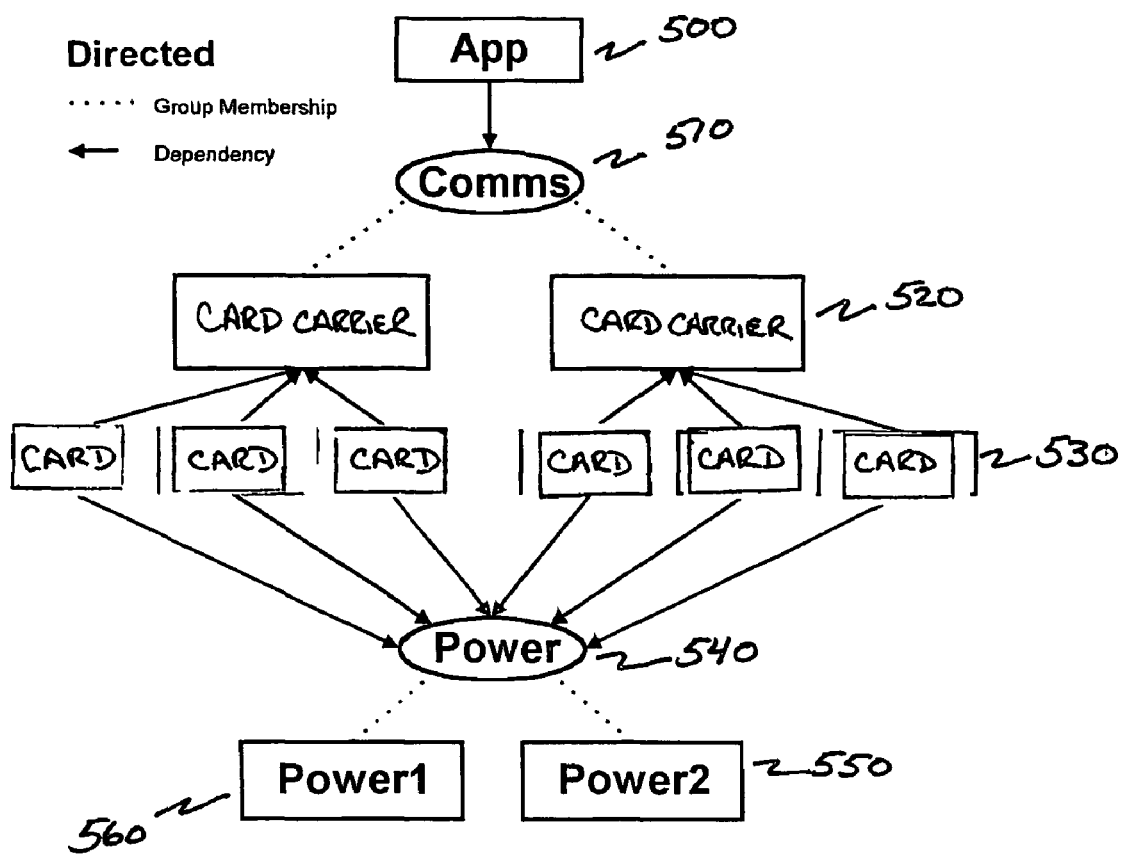
FIG. 5 shows the relationship between resources and service groups.

An example of a service group is the power to a chassis as shown in FIG. 5. Multiple power supplies 550 and 560 work together to ensure uninterrupted power. These supplies are grouped together for management purposes because they are interchangeable—that is, they provide the same service. Other resources depend on power being available, but they do not depend on any individual power supply being operational. Therefore, it is the service the power supplies provide together (the service group) that other managed objects depend on. FIG. 5 also illustrates the dependency relationship between the power 540, the cards 530, and the card carriers 530. The group membership is seen encompassing the communication software 510, the card carriers 520, and the power 540 with the power supplies 550.

Role Assignment

The availability manager assigns roles to managed objects according to the service group policy. Each service group may have its own policy. The AMS provides a set of policies the user may replace. To assign roles, the AMS calls methods on the managed object to set the role, and the managed object must communicate with the resource to actually perform the operation (for example, turn the resource on or off).

A particular resource plays either an active, standby, or unassigned role in the system. In order for a resource to be active or standby, it must have an enabled operational state. Active means that the resource is actively engaged in providing service; standby means that the resource is idle and waiting to take over. Unassigned applies to resources that are neither active nor standby. An enabled or disabled object can have an unassigned role.

When an active object fails, the availability manager promotes a standby object to take over the active role. The availability manager provides several service policies, including: N+1, N+M, and Manual. If there are more objects in the service group than required by the service group policy, they take an unassigned role. If the policy is N+M, these unassigned objects provide a greater level of protection, as they will be brought into an active or standby role when there are insufficient resources. A service group is marked as failed if the number of managed objects in the role of active drops below a user-defined threshold.

The preferredRole attribute setting of a managed object influences its role assignment (only the selection of active). The availability manager attempts to satisfy all preferred roles when performing role assignment. It is often useful to designate a preferred active object when a particular resource is best suited to that role. A preferred role setting does not cause the standard policy to change current satisfied assignments.

A managed object may change its role assignment by having its role follow that of another managed object. This is useful when a set of objects must always have the same role, such as for a Field Replaceable Unit. To do this, an object specifies the ORL of the managed object that will define the role in its leader attribute.

The availability manager balances standby assignments such that standby managed objects are distributed evenly across the active managed objects by using a round-robin redundancy balancing policy. This balancing occurs once, and standbys are not reallocated once assigned unless a failure occurs. A given active object has only one standby object. A standby object may service zero or more active objects. If a different matching operation between actives and standbys is required, that is accommodated through custom policies.

Management

Service groups are modeled in the ORL hierarchy in the same way as managed objects. A managed object is created for each service group, and managed objects depend on these service groups in the same way that managed objects depend upon other managed objects. A managed object may only belong to one service group at a time. Managed objects may join and leave service groups at run time by setting the appropriate attribute.

A service group will be enabled as long as its service policy (the threshold number of actives) is satisfied. For example, an N+1 (threshold of 0) service group where N is equal to 2 will be disabled only if two managed objects in the service group fail.

A service group specifies the required class type for its members. Due to polymorphism, subclassed managed objects of a different class can join the service group. For example, a network service group could be defined to provide a redundant network service for the cluster. This service group could specify that members must be of class Ethernet. A generic Ethernet card of class Ethernet and a manufacturer's Ethernet card of class myEthernet could both be members of the same service group, provided that Ethenet was a base class of myEthernet.

Figure 3:
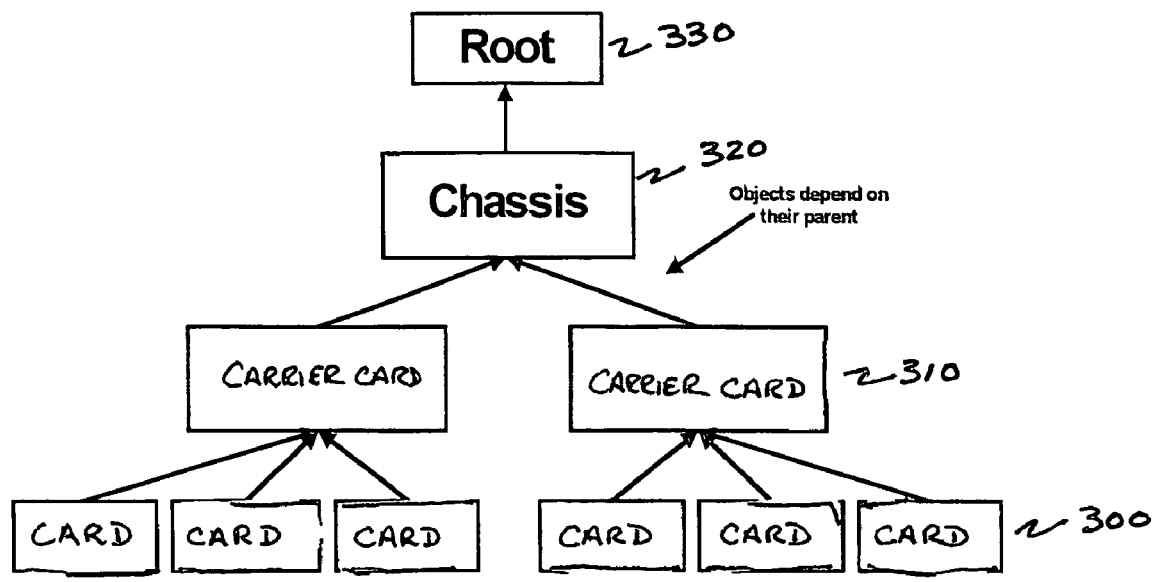
FIG. 3 shows an example of a parent/child relationship.

FIG. 3. Service Groups

Service groups are represented in FIG. 3. The Comms service group has two members: Carrier1 and Carrier2, with an N+1 redundancy model. The Comms service group will be disabled if the Carrier-managed objects are disabled.

Dependency failures or other alterations to a service group do not impact members that are providing service within the service group. However, the operational state of the service group will be calculated based whether the members are providing sufficient services to satisfy the availability parameters of the service group.

Role Assignment Notification

To change roles for the managed object, the availability manager calls various methods in the managed object. These methods are defined as part of the managedobject base class. The methods are:

activate—Command the resource to begin providing service.

standby—Command the resource to act as a standby for one or more active resources.

unassign—Remove the resource from service; it is neither active nor prepared to take over for an active resource.

switchover—Move from standby to active role.

These methods run synchronously. The actual behavior that occurs when the AMS makes an invocation is dependent on the implementation of the method. For some resources, no behavior may be implemented at all.

In addition to notifications of the specific object that is changing roles AMS also notifies active and standby objects of the association between them. This is done via the following methods:

removeActive—Called on the standby object to inform it that an active object has been disassociated with it.

removeStandby—Called on the active object to inform it that a standby object has been disassociated with it.

addActive—Called on the standby object to inform it that an active object has been associated with it.

addStandby—Called on the active object to inform it that an standby object has been associated with it.

updateActiveStandby—Called on all follower objects to inform them that the active or standby associations have changed for their leader object.

Configurable Role Assignment Policies

While the availability manager provides several policies for role assignment, developers may provide their own role assignment policies. This may be required if:

Managed objects need to be paired or assigned to other managed objects during role assignment.

A more complex role assignment policy is required.

There are resources with non-uniform role assignment requirements that cannot be satisfied by the preferred role attribute alone.

The role assignment function is supplied by the policy method of a service group object. Each service group has an attribute that is the name of this function providing this policy.

Custom policies for role assignment are supplied by overriding this method with the desired policy method. The policy method achieves role assignment by modifying the role attribute for member objects and then notifying member objects by calling the relevant role assignment methods (such as activate). The role attribute is protected and cannot be modified by calling srAmsSetObjectAtribute. Policy methods should call srAmsAssignObjectRole to assign a role to a managed object and to notify the object by calling the relevant object methods.

Transactions

When a transaction is started (by calling srAmsStartTm API), a list of managed objects and service groups are reserved for exclusive access. Such reservation marks as "busy" all managed objects that depend on these objects. Subsequent transactions that specify a managed object already marked as busy will not be permitted to continue because they will conflict with the original transaction.

The managed objects that are reserved by the transaction are the listed objects (L) to the transaction and the following objects for each listed object:

Dependents of each list object and all of their dependents (D)

Service groups (S) containing a listed object (L) or dependent object (D)

Group members (M) of all the service groups included above (S)

Followers of all group members (M) include above of M

Leaders of all objects in L or D

Followers of all objects in L or D

Note: Reserving a service group does not reserve its members when the service group is a listed object.

The availability manager uses this synchronization mechanism to control concurrency between multiple simultaneous transactions. If a transaction specifies an object that is already "reserved," the srAmsStartTm will either return an error code or wait on the transaction queue, depending on the flags supplied on the API call. If the wait-mode is specified, the transaction will be queued until it can obtain the necessary reservations or the client application is disconnected.

Callers of the srAmsStartTm API provide several parameters that uniquely identify the transaction and themselves, including a description, ID, and requester name. The API returns a transaction handle that can be used by other APIs to manipulate the transaction. All relevant availability manager APIs pass the transaction handle as a parameter so that the identity of the requester and other transaction details can be accessed.

Transactions are required to perform any manipulation that impacts the AMS state engine. This includes:

Operations that directly impact object state (e.g., a lock or test operation).

Operations that create or delete objects.

Operations that change relationships (e.g., dependencies, leaders, followers, or service group membership).

Operations that change availability properties of a service group.

Transactions must be started as follows:

Operations that directly impact object state must reserve the impacted top-level object. The correct objects are reserved as a result.

Operations that create or delete objects must reserve the parent object.

Operations that change relationships (e.g., dependencies, leaders, followers, or service group membership) must reserve the object being altered and the referenced objects.

Operations that change availability properties of a service group must reserve the service group and its members (locking a service group does not reserve it members).

One final point about transactions and AMS: AMS does not create transaction automatically. A few default exception handlers are provided, but a base architectural principle of the design is that the availability manager does not initiate transactions or operations. So, for example, on a heartbeat failure a customer provided handler or the default handler is responsible for actually failing the object.

Remote-Acting Methods

The availability manager manages resources through their corresponding managed objects. Methods can operate completely locally; operate locally and remotely; or just remotely. The portion of the method operating remotely is called a remote-acting method.

Remote-acting methods execute outside the availability manager and typically close to the resource. One logical choice for the remote-acting method is in the cluster node that hosts the resource. For hardware resources, the remote-acting methods typically reside in an application that communicates with the hardware. For application resources, the remote-acting methods often reside in the application itself. AMS supports these and other architectures, including a proxy application that manages many resources from a single process.

The container for a remote-acting method—from an AMS API perspective—is a remote adapter FIG. 1. 108. The remote adapter is explicitly allocated and associated with a given managed object. The remote adapter can exist in an application process. The remote-acting method is then registered in the context of a given remote adapter.

The process containing the remote-acting methods initializes them using AMS library APIs (allocating a remote adapter and adding the remote method). Once initialized, the availability manager exchanges information with the resource via remote-acting method calls for availability manager requests, heartbeats, and state changes. By calling AMS APIs, the remote-acting methods are also the conduit for asynchronous changes in resource state to be communicated to the availability manager. Note: A remote acting method is invoked in the same way as a local method.

If the resource is on the node with the availability manager (that is, local to the availability manager), remote-acting methods may still be necessary because the availability manager will migrate to another cluster node in the event of a switchover, and communications with the resource should continue uninterrupted. The AMS uses the underlying communications mechanisms to make sure that it maintains communication with the process running the remote-acting methods even when a process on another machine takes over being the active remote adapter.

Figure 6:
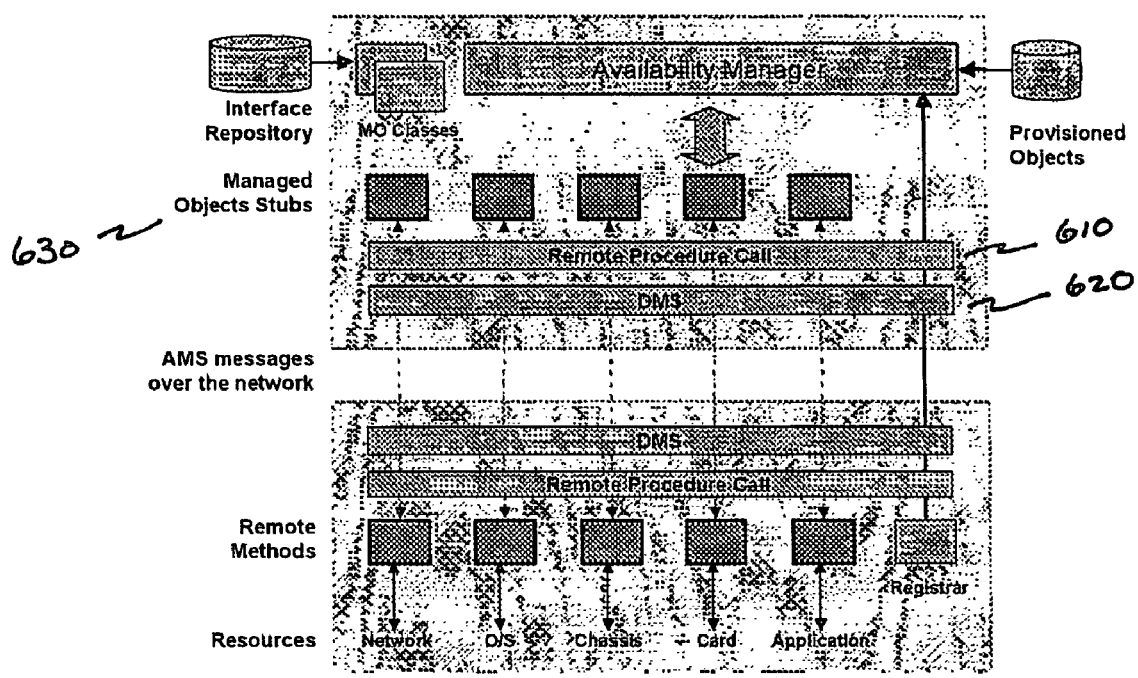
FIG. 6 shows the availability manager architecture that includes the messaging service and the remote procedure calls.

FIG. 6 describes the flow of requests and data from the availability manager to the remote-acting methods that manipulate the resource. The information flows through the managed object stubs 630 via distributed procedure calls 610 over the distributed messaging service 620.

Heartbeats

The availability manager heartbeats managed objects to verify the health and integrity of their corresponding resources. The heartbeat mechanism leverages the integrated DMS heartbeat facility, audits the operation of the resource at specified intervals, and reports status back to the availability manager if a resource fails. If a heartbeat fails, the availability manager raises an exception to have the object failed. The base availability manager architecturally is not allowed to fail an object itself. Default exception handlers are provided as part of the base system, however.

Heartbeats are configured by setting a timeout value and a retry value. The two in combination determine how often a heartbeat is sent. An object is considered faulted when more than the retry value of heartbeats has been lost in a row. A long-running program (for example, some diagnostics) must be multi-threaded, or use some other mechanism to make sure the heartbeat response is done in a timely manner.

AMS heartbeats are designed for low latency and high frequency. The AMS that is local to the remote-acting methods issues the resource heartbeat, not the cluster manager (unless they are the same node). Communications across the network only occurs if the heartbeat fails. If a failure occurs, notification is sent to the availability manager. (Note that the cluster manager is heart beating all the nodes. The rate of cluster heartbeating impacts the rate at which managed object faults are detected. Specifically, heartbeats are done by the availability manager node to target node and from target node to target node remote adapter.)

The heartbeat period is controlled by the heartbeatTimeout attribute of the managed object. The number of retries during that period is determined by the heartbeatRetties attribute of the managed object. On each heartbeat, the heartbeat method is invoked. This method is called within the availability manager and in the host application of the remote adapter. The application may then test the integrity of the resource and respond by returning from the method call with a true/false return value. Exposing heartbeats to the managed object class in this manner allows the heartbeat to go beyond just testing the integrity of the network route to the resource. Instead, heartbeating allows a complete end-to-end integrity check.

Note that a managed object is not required to have a heartbeat. If the user does not define a heartbeat timeout, the managed object will not get a heartbeat.

Registrars

Managed object classes provide the interface between the availability manager and the resource, but they do not provide the code to detect resources or to create managed objects. That job falls to registrars, 208 as shown in FIG. 2, who must detect and identify a resource, and then create a managed object of the required class to represent it.

Registrars are responsible for the life cycle of managed objects. Registrars can create managed objects, or the objects may be statically provisioned. In the latter case, the managed objects already exist when the registrar first communicates with the availability manager. The registrar must then "connect" the managed object to the corresponding resource. The "connect" process is the action taken when registrar discovers the resource. The registrar is also responsible for deleting the managed object; if that is appropriate.

Registrars initialize themselves with the AMS library by calling srAmsAddRegistrar, which registers a status method to be called when the availability manager is ready to receive managed object creation requests. Registrars are separate entities from the managed object class; however, for convenience, they may be packaged with the managed object class into a single extension.

The availability management service provides no registrars but developers can easily create their own. Registrars may poll for the existence of resources, or they may receive asynchronous notification of the presence of a new resource. Registrars must be designed to work together to manage resources. Cooperative design prevents two registrars from trying to create a managed object for the same resource, which will result in the second registrar receiving an error.

Registrars that create objects are responsible for doing so in an appropriate order. Other managed objects cannot reference managed objects until they exist. For example, it is an error to have a dependency of a managed object that does not exist or to create a managed object of a parent managed object where the parent does not yet exist.

Provisioned Objects

The availability manager system database can be provisioned to represent a "desired" system configuration. Provisioned objects 210 as seen in FIG. 2 are created using the srAmsCreateobject API with a flag to request persistency. Provisioned objects are also created at run time and the persisted data store becomes part of the associated solution.

A registrar notifying the availability manager that a resource has been detected discovers provisioned objects. The registrar does this by setting the resource state to something other than noResource.

Dependency Relationships

The availability manager maintains its system database as a dual-connected in-memory digraph where each managed object is linked to every managed object upon which it depends, and each managed object is linked to every managed object that depends on it. This data representation provides very fast traversal and enables the required dependency relationships to effectively model complex systems.

Parent/Child Relationships

The parent/child relationships in an ORL represent more than just a parent and child name relationship. The ORL represents containment relationships via parent/child relationships. As illustrated in FIG. 3 we have the root 330, which is the starting point in the hierarchy, a chassis 320 which is the box that contains the carrier cards, and the carrier cards 310 themselves that support the daughter cards 300 (PCBs).

A parent is simply the object whose name is to the left of the child's in the ORL, e.g. in "/Chassis 320/Carrier card 310/card 300" note that "Chassis 320" is the parent of "Carrier Card 310".

Children depend on their parent's presence and health for them to be enabled so they can be assigned work in the system. By tracing a path from the root to the designated managed object, the ORL is formed which encodes the parent child relationships.

Service Dependency Relationships

Figure 4:
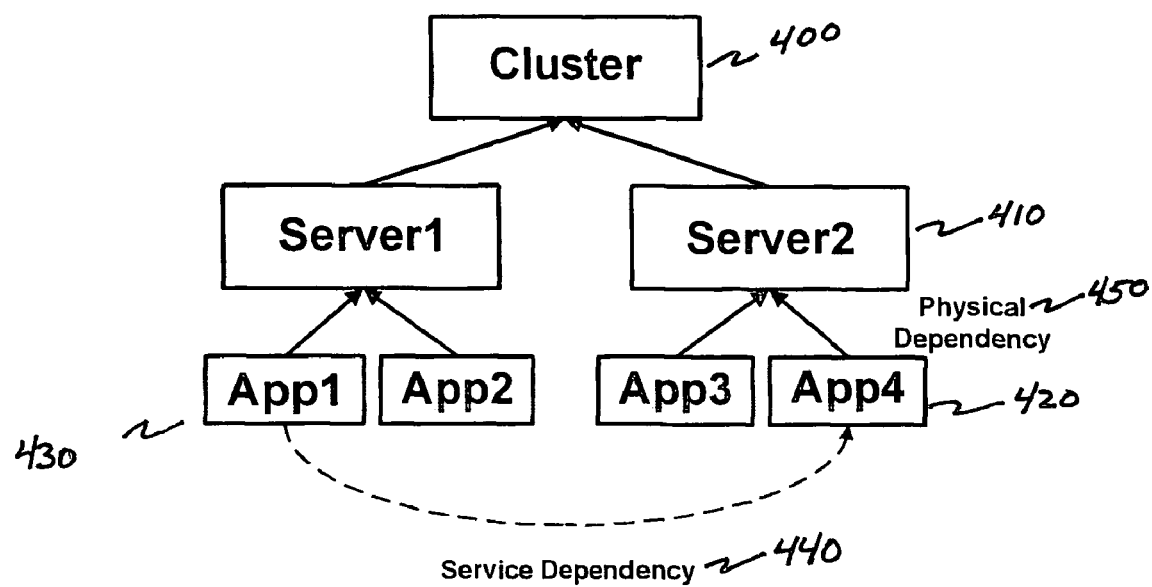
FIG. 4 shows a physical dependency and a service dependency among resources.

A service dependency 440 as shown in FIG. 4 is a relationship between managed objects in which the second managed object (the child) requires the first (the parent) to have an operational state (opState) of enabled before the second managed object can itself be enabled. Whereas there is a physical dependency 450 between Application 4 420 and server2 410 there is also a service dependency 440 between Application1 430 and Application 4 420. The availability manager system model contains dependencies where a managed object may depend on any other managed object including a service group. Service dependencies 440 are dynamic and are created by the managed object class by calling the srAmsSetObjectDependencies API at any time.

Loops are possible where one resource depends on another, which in turn depends on the first (or more complicated dependency relationships). AMS detects and resolves these loops by determining when a given managed object is only disabled due dependency factors within its dependency digraph.

Loops may be required to effectively model resource dependencies. When propagating the impact of a state change, the availability manager marks a visited object and thus will traverse loops only once. Loops are a normal part of a typical dependency relationship graph, and it is not possible for the availability manager to distinguish between an intended loop and an unintentional loop. In either case, the availability manager traverses the loop only once.

Checkpointing

The purpose of checkpointing 116 is to keep the standby resource 112 114 as current as possible with the active resource's 100 state and data. Replicated databases can be used to provide a storage-based checkpointing implementation.

Failure Detection

When a resource failure occurs, as a result of heartbeat failure, the availability manager posts an exception for the managed object. The exception handler is responsible for failing the managed object or getting the object operating again.

Fault detectors may also be used to do ad hoc fault detection for the resource. When a fault detector identifies a fault, a designated recovery policy is invoked, which may mark the managed object as failed.

Access and Control of Resources

The availability manager provides a comprehensive API that permits full control over an SNMP connection using the SNMP agent. Similarly, a Web interface can be used to display and control the availability manager. The console provides a standard Web-based interface to visualize and control the availability manager and all managed objects.

Managed Object Classes

Managed object classes are defined in the interface repository using the srAmsCreateClass API. This API specifies the complete details of the class, including the locations of the attribute and method XML description files and the extension containing the class, or defines them in the classes .xml file.

Figure 7:
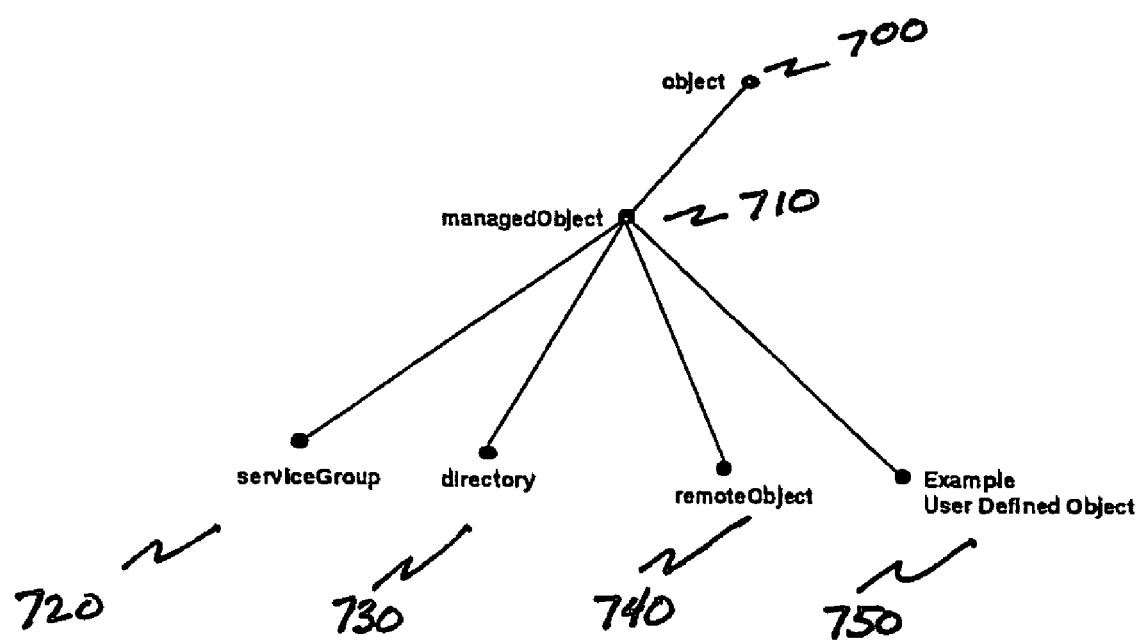
FIG. 7 shows the availability manager class hierarchy.

FIG. 7. Availability Manager Class Hierarchy

The standard classes, as depicted above, are:

object 700—The root class comes from the OMS.
managedObject 710—The primary base class for all objects that need availability management.
directory 730—The standard base class for object organizational purposes.
remoteObject 740—The standard base class for remote-acting methods.
serviceGroup 720—The base class for all service groups.
Example user-defined object 750—A possible user defined object class. Could be derived from any managedobject derived class.

The default class for managed objects is managedobject. However, in the preferred embodiment, use of the SR_AMS_DEFAULT_CLASS, that is defined for managed objects that do not need any specific class should provide the attributes or methods rather than hard-coding managedobject as the class.

Attributes of each class can have the following modifiers:
Persistent—Retain their values across system reboots.
Replicated—Checkpoint their values in case of failure.
Read-only—May not have their value modified
Observed—Manipulated via the set and get methods.
Protected—May only be modified by the availability manager.

object Class

The "Object" class is the root class for all objects. It provides dependencies and object version and attributes.

managedObject Class

The managedObject class is the essential base class for all objects that are managed by the availability manager. It subclasses the object class and adds support for an ISO state model, service group membership, Web-based management, and provisioning.

The availability manager maintains a set of attributes that support the ISO X.731 state model, which includes the following attributes:
Administration state—adminState
Operational state—opState
Usage states—usage
Availability status—availStatus
Control status—controlStatus The availability manager extends the ISO model by adding attributes to provide a more comprehensive managed object and resource state model. The availability manager updates both the ISO states and the extended states in response to availability manager API calls. This may cause various resource methods to be invoked to interact with the resource. The methods that represent a portion of the state engine (e.g., enable, disable) can be called twice in some failure situations.

The state engine methods always roll forward in the face of failures. For example, if a disable method returns a network error, then the state engine does not attempt to undo whatever operation it was initiating. Instead it completes the operation. When remote-acting methods fail, the methods are disabled to prevent further timeouts during state engine processing.

serviceGroup Class

The serviceGroup class 720 as shown in FIG. 7 is the base class for all service group managed objects. It subclasses the managedObject class and adds support for the name, policy, and parameters that govern a service group.

A service group calculates its resources state based on the satisfaction of the policy parameters. The standard policy raises an exception when the number of active service group members is less than the threshold for the service group. A default exception handler is provided that responds by calling srAmsCalcServiceGroupState to change the resourceState attribute to "failed." When the threshold is satisfied a new exception is raised to change the resourceState to "healthy". Managed objects can depend on service group objects. The service group's opState is calculated based on standard rules—thus setting resourceState has a direct effect. Disabling a service group has no direct impact on its members continuing to provide service unless there is a dependency between the service group and the members—which is atypical.

Making a service group a dependent of another object does not meaningfully impact the service group's members. The members will continue to provide service if they can, even when the service group is disabled due to a dependency—assuming no (customer defined) direct dependency between the service group and its members.

The serviceGroup class provides the following attributes:

In addition to the managedobject methods, the serviceGroup class adds the following method:

directory Class

The directory class 730 is provided to allow objects to be organized in logical groups within the ORL tree. It subclasses the managedobject class but provides no unique methods or attributes.

remoteObject Class

The remoteObject class 740 is a class that passes all method calls onto a remote-acting method for all managedobject methods. It subclasses the managedobject class. It can be used for a class and needs no additional attributes or methods buts wants the managedobject class methods to be remote-acting methods.

Working with the Availability Manager

Cluster Topology

The availability manager runs on the same node as the cluster manager. Having the configuration and role management occur in one location simplifies many availability issues. To provide consistent (location-independent) usage, the availability manager provides API interfaces for managed objects on both the cluster manager node and on client nodes.

A standby availability manager runs on the cluster standby node and executes as a hot standby. If the node on which availability manager is executing fails, the standby availability manager assumes availability management without any loss of state or configuration. AMS clients are informed of the failover and suspend calling availability manager APIs until the standby availability manager has assumed the active role. Until that time, availability manager APIs block waiting for the availability manager to come ready. When the availability manager changes its readiness status, the stub for the AMS API retries the operation to the new manager.

Applications or remote adapters can register to receive a callback on manager status changes by using the srAmsAddRegistrar API.

The classes used for the standard cluster objects and cluster service groups can be overridden—allowing solutions to provide non-standard behaviors or policies.

Extending the Classes and Adding New Methods

The availability manager service allows new classes to be defined with customer-defined methods. The standard classes can be used as base classes for these derived classes. New methods can be defined by registering the methods as part of the class initialization. The new methods can also become remote acting methods by using distributed procedure call services.

API Discussion

C Functions

Conclusion

The availability management service's goal is to minimize downtime due to failures or planned outages. It achieves this goal by managing resources through managed objects. A cluster-wide or stand-alone solution, the availability manager provides interfaces for managed objects on the cluster manager and client nodes. The availability manager performs role assignment for managed objects in services groups, and it responds to changing system conditions, reassigning roles as required.

The availability manager maintains a comprehensive system description of the system's configuration. It maintains complete state information for the resource and offers an object-oriented scheme of class attributes and methods.

Figure 8:
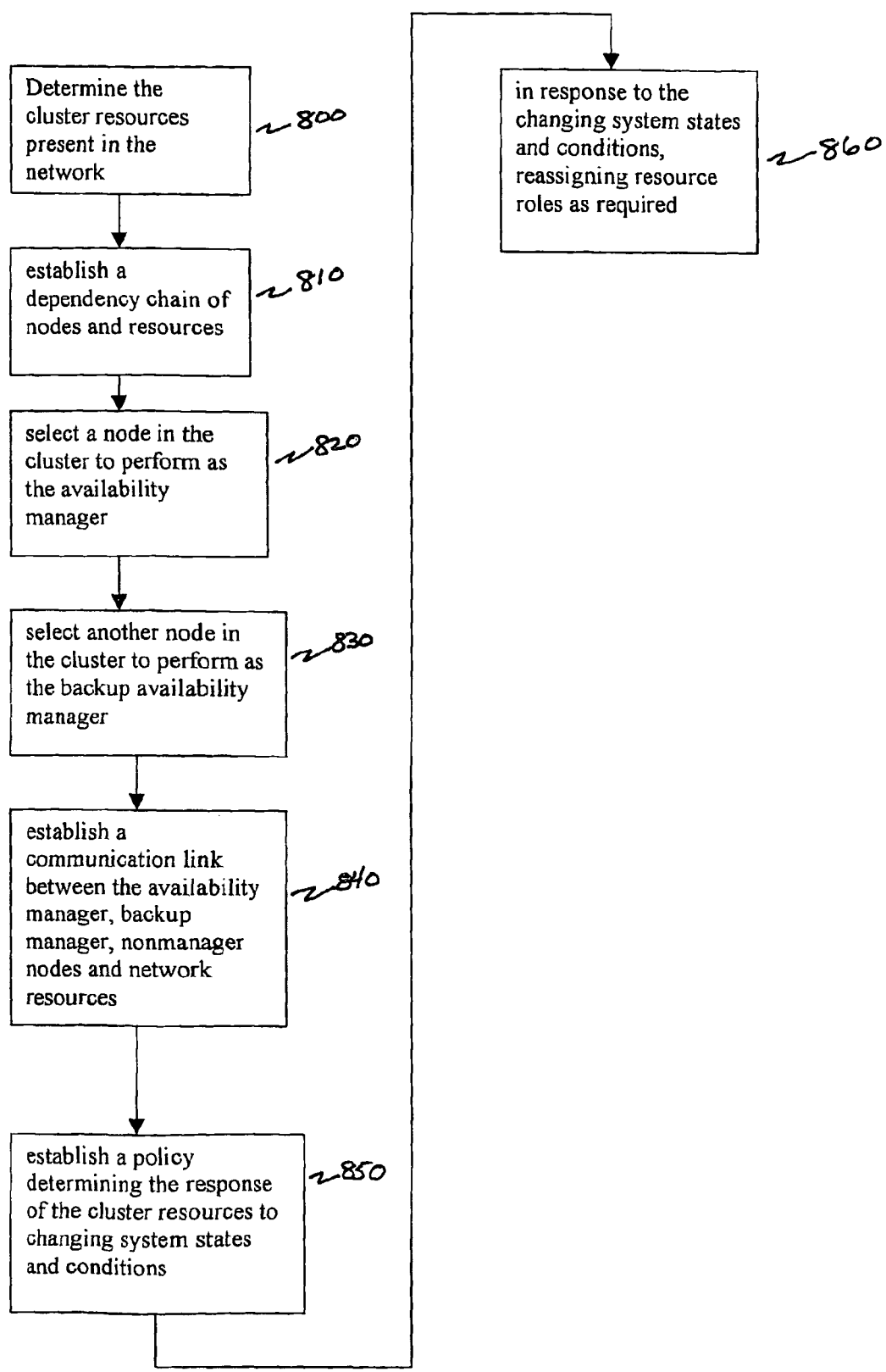
FIG. 8 is a flowchart showing the availability manager process.

As illustrated in FIG. 8 the steps include finding the resources on the cluster 800, establishing a dependency chain 810, selecting a node as the availability manager 820, selecting a standby availability manager (as backup) 830, establishing a communication link between the availability manager, standby availability manager, non-manager nodes and the other managed objects representing the resources 840, establishing a policy to determine the desired responses 850, and by assigning resources in response to the changing system states 860.

The beforementioned description of the system and method for making multimode clusters highly available according to the preferred embodiments is merely exemplary in nature and is no way intended to limit the invention or its application or its uses. Further in the abovementioned description numerous details for the methods and systems used are set forth to provide a more thorough understanding of the present invention. It will be apparent, however to one skilled in the art, that the present invention may be practiced without those specific details. In other instances, characteristics and functions of well-known processes have not been described so as to not obscure the present invention.

We claim:

1. A method for maintaining on demand and uninterrupted access to a networked computer system service comprising the steps of:
    a) determining what cluster resources are present in a network and providing a managed object abstraction to represent the cluster resource;
    b) establishing a directed graph of dependencies among the resources;
    c) selecting a particular node as an availability manager for the cluster;
    d) establishing communication links among the availability manager, any non-manager nodes and the managed objects representing the resources;
    e) establishing a policy determining the desired response of the cluster resources to changing system states and conditions; and
    f) responding to the changing system states and conditions by reassigning resource roles as required.

2. The method of claim 1 wherein the cluster resources include hardware components, applications, middleware and operating systems.

3. The method of claim 1 further including the steps of providing a consistent and uniform interface to the cluster resources via APIs, console commands and SNMP agents.

4. The method of claim 1 further including the step of selecting another node as a standby availability manager.

5. The method of claim 4 further including establishing communication links to the standby availability manager.

6. The method of claim 5 wherein the cluster resources include hardware components, applications, middleware and operating systems.

7. The method of claim 5 further including the steps of providing a consistent and uniform interface to the cluster resources via APIs, console commands and SNMP agents.

* * * * *